(12) United States Patent
Zhang

(10) Patent No.: US 11,256,124 B2
(45) Date of Patent: Feb. 22, 2022

(54) LIQUID CRYSTAL DISPLAY DEVICE

(71) Applicant: WUHAN CHINA STAR OPTOELECTRONICS TECHNOLOGY CO., LTD., Wuhan (CN)

(72) Inventor: Wei Zhang, Wuhan (CN)

( * ) Notice: Subject to any disclaimer, the term of this patent is extended or adjusted under 35 U.S.C. 154(b) by 378 days.

(21) Appl. No.: 16/470,979

(22) PCT Filed: Mar. 5, 2019

(86) PCT No.: PCT/CN2019/076941
§ 371 (c)(1),
(2) Date: Jun. 19, 2019

(87) PCT Pub. No.: WO2020/133685
PCT Pub. Date: Jul. 2, 2020

(65) Prior Publication Data
US 2021/0333618 A1    Oct. 28, 2021

(30) Foreign Application Priority Data

Dec. 24, 2018 (CN) .......................... 201811580454.5

(51) Int. Cl.
*G02F 1/1335* (2006.01)
*G02F 1/1333* (2006.01)
*F21V 8/00* (2006.01)

(52) U.S. Cl.
CPC ..... *G02F 1/133512* (2013.01); *G02B 6/0055* (2013.01); *G02B 6/0086* (2013.01); *G02F 1/133331* (2021.01)

(58) Field of Classification Search
None
See application file for complete search history.

(56) References Cited

U.S. PATENT DOCUMENTS

2016/0062174 A1    3/2016  Jeong
2020/0285097 A1*   9/2020  Zhang .................. G02B 6/0088

FOREIGN PATENT DOCUMENTS

| CN | 105807467 A | 7/2016 |
| CN | 106647074 A | 5/2017 |
| CN | 108227269 A | 6/2018 |
| CN | 207516697 U | 6/2018 |
| EP | 2804046 A1 | 11/2014 |

* cited by examiner

*Primary Examiner* — Richard H Kim
(74) *Attorney, Agent, or Firm* — JMB Davis Ben-David

(57) ABSTRACT

A liquid crystal display device, includes a cover glass; a liquid crystal display module disposed below the cover glass; and a backlight module disposed below the liquid crystal display module and including a light emitting source, a light guide plate, a reflector sheet, a diffuser film, a prism film, a dual brightness enhancement film, and a plastic frame. Both sides of the liquid crystal display module between the cover glass and a top surface of the plastic frame and a partial area of the top surface of the plastic frame are coated with an opaque plastic adhesive.

16 Claims, 2 Drawing Sheets

LIQUID CRYSTAL DISPLAY DEVICE

CROSS-REFERENCE TO RELATED APPLICATIONS

This is the US National Stage of International Patent Application No. PCT/CN2019/076941, filed Mar. 5, 2019, which claims the benefit of Chinese Patent Application No. 201811580454.5, filed Dec. 24, 2018.

FIELD OF INVENTION

The present invention relates to the field of display technology, and in particular, to a liquid crystal display device for solving light leakage.

BACKGROUND OF INVENTION

A liquid crystal display device includes a liquid crystal display panel, the liquid crystal display panel includes a glass substrate laminated with other components, for example, an upper polarizer and a lower polarizer are respectively laminated on upper and lower sides of the liquid crystal display panel. A side of optical films composed of several layers is bonded to the lower polarizer by an adhesive film, and the other side of the optical films is sequentially laminated with a light guide plate and a reflector sheet. A plastic frame is arranged around the liquid crystal display panel, and the plastic frame extends between the optical films and a reflector sheet and is bonded to the reflector sheet. Components of optical films, a light guide plate, a reflector sheet, and a plastic frame, etc. constitute a backlight module.

Conventional liquid crystal display devices generally have light leaking from the space between a plastic frame and a middle frame in the device, and the light is reflected by side walls of the middle frame in the device, and leaking out from a window region of the device. Therefore, the visual effect is not good, especially when an image displays in all black, the problem of light leakage will be more obvious. In order to prevent the above-mentioned light leakage problem from affecting the display effect, one conventional method to solve the light leakage problem is adhering black double-sided tape among the members in the device.

TECHNICAL PROBLEM

However, in order to realize a currently narrow border or even an extremely narrow border display device, the light leakage problem cannot be solved by the conventional method of adhering black double-sided tape due to the limitation of a device space and process. In addition, the method of adhering black double-sided tape to the plastic frame is manual, if there is a gap, light will leak from the gap, so that the light leakage problem still exists.

In order to solve the light leakage problem, one conventional method is to make a plastic frame in black, and solve the problem of light leakage around the backlight module by light absorption of the black plastic frame. However, the black plastic frame absorbs a part of the light at the edge of a light guiding region from the side, which causes brightness of the light emitted by the backlight module to be low, resulting in poor luminous efficiency. Although the black plastic frame effectively solves the light leakage problem from a side of the black plastic frame, it has another problem that the backlight module has low luminous efficiency.

Therefore, it is still not a good way to solve the light leakage problem from the side of the black plastic frame.

As shown in FIG. 1, it is a conventional liquid crystal display device, light 1 emitted from a light source 41 is partially transmitted from a side of a plastic frame 47. The transmitted light 1 is reflected by a side wall of a middle frame 10 of a mobile phone and passes through a window region of module glass 21 to a surface of the mobile phone, and entering a human eye from the side, causing a bad visual experience.

TECHNICAL SOLUTION

To solve the above problem, the present invention provides a liquid crystal display device including:

a cover glass; a liquid crystal display module disposed below the cover glass; and a backlight module disposed below the liquid crystal display module and including a light emitting source, a reflector sheet, a light guide plate, optical films, and a plastic frame; wherein both sides of the liquid crystal display module between the cover glass and a top surface of the plastic frame and a partial area of the top surface of the plastic frame are coated with an opaque plastic adhesive.

Preferably, the light emitting source is a cold cathode fluorescent lamp or a light emitting diode or an organic light emitting diode.

Preferably, the optical films include a diffuser film, a prism film, and a dual brightness enhancement film.

Preferably, the liquid crystal display module includes a glass substrate, an upper polarizer, and a lower polarizer.

Preferably, an optically clear adhesive layer is disposed between the upper polarizer and the cover glass, a frame adhesive layer is disposed between the lower polarizer and the backlight module, and both sides of each of the optically clear adhesive layer and the frame adhesive layer are coated with the opaque plastic adhesive.

Preferably, the opaque plastic adhesive is a hot melt adhesive or a photosensitive adhesive.

Preferably, the opaque plastic adhesive is black.

Preferably, coating of the opaque plastic adhesive is carried out by a dispenser equipped with an injection valve.

Preferably, the injection valve is a piezoelectric injection valve or a pneumatic injection valve.

Preferably, the opaque plastic adhesive has a thickness between 0.1 and 0.5 millimeters (mm).

The present invention further provides a liquid crystal display device including:

a cover glass; a liquid crystal display module disposed below the cover glass and including a glass substrate, an upper polarizer, and a lower polarizer; a backlight module disposed below the liquid crystal display module and including a light emitting source, a reflector sheet, a light guide plate, optical films, and a plastic frame, the light emitting source is a cold cathode fluorescent lamp or a light emitting diode or an organic light emitting diode, the optical films includes a diffuser film, a prism film, and a dual brightness enhancement film; wherein both sides of the liquid crystal display module between the cover glass and a top surface of the plastic frame and a partial area of the top surface of the plastic frame are coated with an opaque plastic adhesive.

Preferably, an optically clear adhesive layer is disposed between the upper polarizer and the cover glass, and a frame adhesive layer is disposed between the lower polarizer and the backlight module, and both sides of each of the optically clear adhesive layer and the frame adhesive layer are coated with the opaque plastic adhesive.

Preferably, the opaque plastic adhesive is a hot melt adhesive or a photosensitive adhesive.

Preferably, the opaque plastic adhesive is black.

Preferably, coating of the opaque plastic adhesive is carried out by a dispenser equipped with an injection valve.

Preferably, the injection valve is a piezoelectric injection valve or a pneumatic injection valve.

Preferably, the opaque plastic adhesive has a thickness between 0.1 and 0.5 millimeters (mm).

The present invention further provides a liquid crystal display device including:

a cover glass; a liquid crystal display module disposed below the cover glass and including a glass substrate, an upper polarizer, and a lower polarizer; a backlight module disposed below the liquid crystal display module and including a light emitting source, a reflector sheet, a light guide plate, optical films, and a plastic frame; wherein both sides of the liquid crystal display module between the cover glass and a top surface of the plastic frame and a partial area of the top surface of the plastic frame are coated with an opaque plastic adhesive; and wherein the light emitting source is a cold cathode fluorescent lamp or a light emitting diode or an organic light emitting diode.

Preferably, an optically clear adhesive layer is disposed between the upper polarizer and the cover glass, a frame adhesive layer is disposed between the lower polarizer and the backlight module, and both sides of each of the optically clear adhesive layer and the frame adhesive layer are coated with the opaque plastic adhesive.

Preferably, the opaque plastic adhesive is a hot melt adhesive or a photosensitive adhesive.

BENEFICIAL EFFECT

As shown in FIG. 3, it is a liquid crystal display device coated with a black opaque plastic adhesive in a preferred embodiment of the present invention. Because the black opaque plastic adhesive absorbs light, it can effectively block a light leak from a plastic frame, and so as to prevent the light reflected from a middle frame of a mobile phone. Therefore, the problem of light from a light source of the backlight module is leaking can be solved.

DETAILED DESCRIPTION OF PREFERRED EMBODIMENTS

Figure 1:
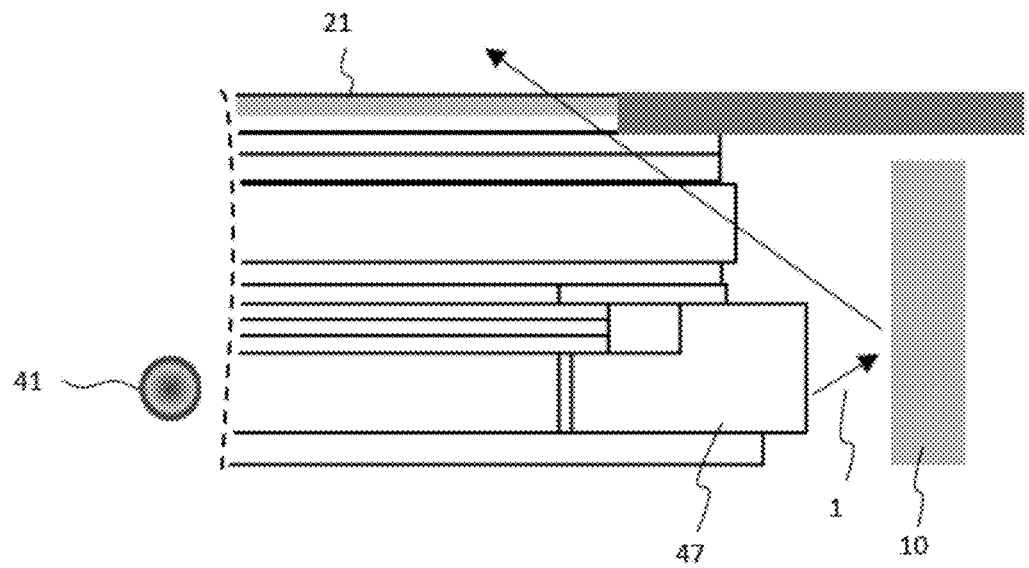
FIG. 1 is a cross-sectional view showing a structure of a conventional liquid crystal display panel.

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

The following description of the various embodiments is provided to illustrate the specific embodiments of the invention. The directional terms mentioned in the present invention, such as "on," "below", "front", "behind", "left", "right", "inside", "outside", "side", etc., are merely references of the direction in the drawings. Therefore, the directional terminology used is for the purpose of illustration and understanding of the invention rather than limiting the invention. In the drawings, the structurally similar elements are denoted by the same reference numerals.

Figure 3:
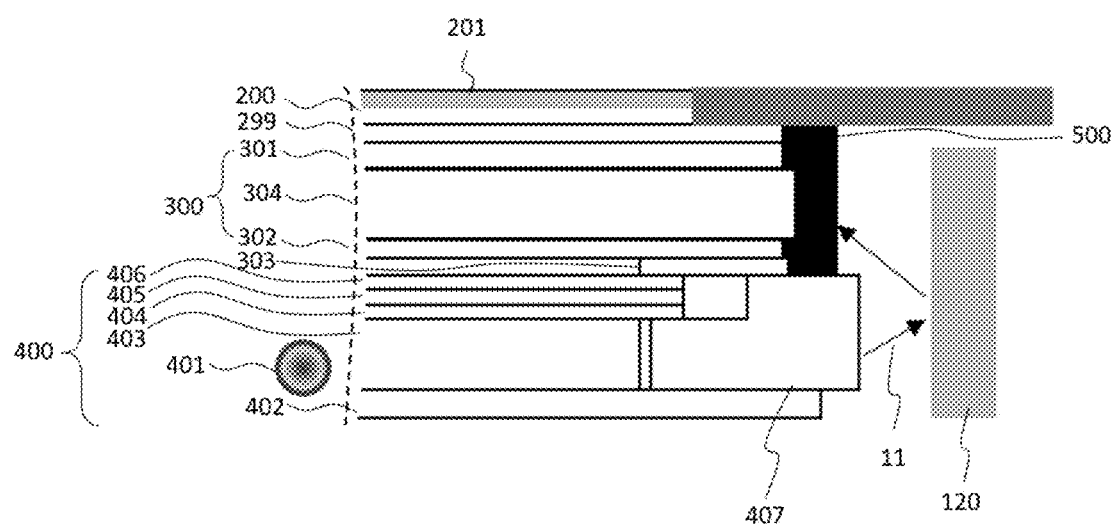
FIG. 3 is a cross-sectional view showing a structure of a liquid crystal display panel in a preferred embodiment of the present invention.

Please refer to FIG. 3, a liquid crystal display device in a preferred embodiment of the present invention including:

a touch module 200 including a module glass 201; a liquid crystal display module 300 including a glass substrate 304, an upper polarizer 301, and a lower polarizer 302, which are disposed below the touch module 200; a backlight module 400 disposed below the liquid crystal display module 300 including a light emitting source 401, a reflector sheet 402, a light guide plate 403, a diffuser film 404, a prism film 405, a dual brightness enhancement film 406, and a plastic frame 407; wherein both sides of the liquid crystal display module 300 between touch module 200 and a top surface of the plastic frame 407 (left side not shown) including both sides of an optical transparent adhesive 299 below the touch module 200 and both sides of a frame adhesive layer 303 and a partial area of top surface of the plastic frame 407 are coated with an opaque plastic adhesive 500.

In a preferred embodiment of the invention, the light emitting source 401 is a cold cathode fluorescent tube or alternatively a light emitting diode or alternatively an organic light emitting diode. The plastic frame 407 is preferably manufactured by injection molding. The opaque plastic adhesive 500 is a black hot melt adhesive or alternatively a black photosensitive adhesive.

Figure 2:
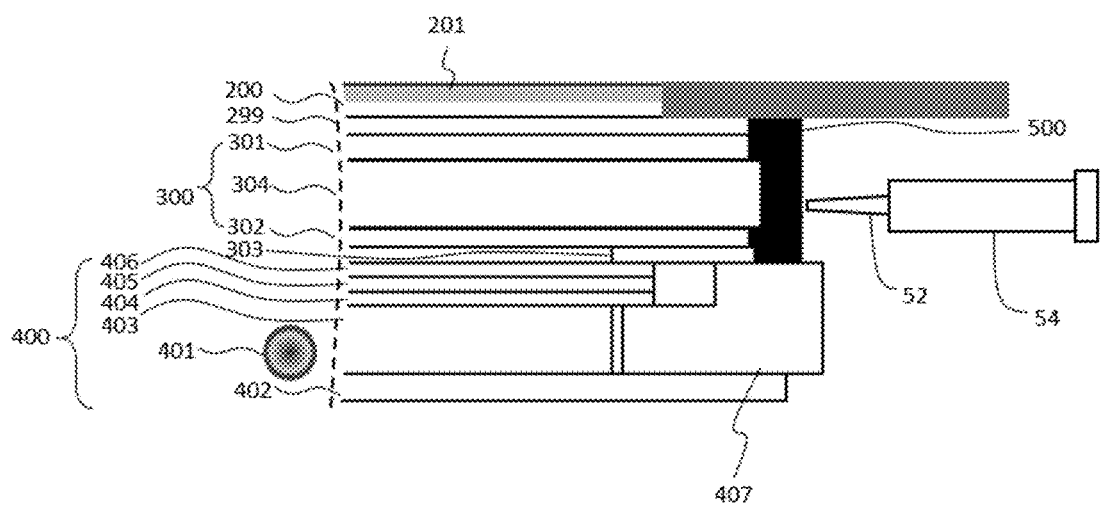
FIG. 2 is a schematic view showing a plastic adhesive applied to a liquid crystal display panel by a dispenser in a preferred embodiment of the present invention.

As shown in FIG. 2, both sides of liquid crystal display module 300 between touch module 200 and a top surface of plastic frame 407, including both sides of an optical transparent adhesive 299 below the touch module 200 and both sides of the frame adhesive layer 303 and a partial area of a top surface of the plastic frame 407 are coated with an opaque plastic adhesive 500 by a dispenser 54 equipped with a high-precision injection valve 52.

The injection valve 52 is a piezoelectric injection valve or alternatively a pneumatic injection valve.

The plastic adhesive 500 has a thickness between 0.1 and 0.5 millimeters (mm).

As shown in FIG. 3, it is a liquid crystal display device coated with a black opaque plastic adhesive 500 in a preferred embodiment of the present invention. Because the black opaque plastic adhesive 500 absorbs light, it can effectively block light 11 leak from plastic frame 407, so as to prevent the light reflected from a middle frame 120 of the mobile phone. Therefore, the problem of light leakage from a light source 401 of the backlight module 400 can be solved.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A liquid crystal display device comprising:
a touch module;
a liquid crystal display module disposed below the touch module, wherein the liquid crystal display module comprises a glass substrate, an upper polarizer disposed on the glass substrate, and a lower polarizer disposed under the glass substrate; and a backlight module disposed below the liquid crystal display module, wherein the backlight module comprises a light emitting source, a reflector sheet, a light guide plate, optical films, and a plastic frame;

wherein a frame adhesive layer is provided between a partial surface of the plastic frame and a peripheral surface of the lower polarizer, and an optical transparent adhesive is provided between the touch module and the upper polarizer;

wherein an opaque plastic adhesive is coated on a top surface of the plastic frame and a side of the frame adhesive layer, the liquid crystal display module, and the optical transparent adhesive; and wherein a side of the plastic frame is configured to be a light transmission surface.

2. The liquid crystal display device according to claim 1, wherein the light emitting source is a cold cathode fluorescent lamp or a light emitting diode or an organic light emitting diode.

3. The liquid crystal display device according to claim 1, wherein the optical films include a diffuser film, a prism film, and a dual brightness enhancement film.

4. The liquid crystal display device according to claim 1, wherein the opaque plastic adhesive is a hot melt adhesive or a photosensitive adhesive.

5. The liquid crystal display device according to claim 1, wherein the opaque plastic adhesive is black.

6. The liquid crystal display device according to claim 1, wherein coating of the opaque plastic adhesive is carried out by a dispenser equipped with an injection valve.

7. The liquid crystal display device according to claim 6, wherein the injection valve is a piezoelectric injection valve or a pneumatic injection valve.

8. The liquid crystal display device according to claim 1, wherein the opaque plastic adhesive has a thickness between 0.1 and 0.5 millimeters (mm).

9. A liquid crystal display device comprising:
a touch module;
a liquid crystal display module disposed below the touch module, wherein the liquid crystal display module comprises a glass substrate, an upper polarizer, and a lower polarizer;
a backlight module disposed below the liquid crystal display module, wherein the backlight module comprises a light emitting source, a reflector sheet, a light guide plate, optical films, and a plastic frame, the light emitting source is a cold cathode fluorescent lamp or a light emitting diode or an organic light emitting diode, the optical films includes a diffuser film, a prism film, and a dual brightness enhancement film;

wherein a frame adhesive layer is provided between a partial surface of the plastic frame and a peripheral surface of the lower polarizer, and an optical transparent adhesive is provided between the touch module and the upper polarizer;

wherein an opaque plastic adhesive is coated on a top surface of the plastic frame and a side of the frame adhesive layer, the liquid crystal display module, and the optical transparent adhesive; and wherein a side of the plastic frame is configured to be a light transmission surface.

10. The liquid crystal display device according to claim 9, wherein the opaque plastic adhesive is a hot melt adhesive or a photosensitive adhesive.

11. The liquid crystal display device according to claim 9, wherein the opaque plastic adhesive is black.

12. The liquid crystal display device according to claim 9, wherein coating of the opaque plastic adhesive is carried out by a dispenser equipped with an injection valve.

13. The liquid crystal display device according to claim 12, wherein the injection valve is a piezoelectric injection valve or a pneumatic injection valve.

14. The liquid crystal display device according to claim 9, wherein the opaque plastic adhesive has a thickness between 0.1 and 0.5 millimeters (mm).

15. A liquid crystal display device comprising:
a touch module;
a liquid crystal display module disposed below the touch module, wherein the liquid crystal display module comprises a glass substrate, an upper polarizer, and a lower polarizer;
a backlight module disposed below the liquid crystal display module, wherein the backlight module comprises a light emitting source, a reflector sheet, a light guide plate, optical films, and a plastic frame;

wherein a frame adhesive layer is provided between a partial surface of the plastic frame and a peripheral surface of the lower polarizer, and an optical transparent adhesive is provided between the touch module and the upper polarizer;

wherein an opaque plastic adhesive is coated on a top surface of the plastic frame and a side of the frame adhesive layer, the liquid crystal display module, and the optical transparent adhesive;

wherein a side of the plastic frame is configured to be a light transmission surface; and wherein the light emitting source is a cold cathode fluorescent lamp or a light emitting diode or an organic light emitting diode.

16. The liquid crystal display device according to claim 15, wherein the opaque plastic adhesive is a hot melt adhesive or a photosensitive adhesive.

* * * * *